US008629348B2

(12) United States Patent
Moselle

(10) Patent No.: US 8,629,348 B2
(45) Date of Patent: Jan. 14, 2014

(54) FIRE RESISTANT BARRIER

(75) Inventor: Happy Moselle, Burnsville, MN (US)

(73) Assignee: E.Z. Barrier, Inc., Burnsville, MN (US)

( * ) Notice: Subject to any disclaimer, the term of this patent is extended or adjusted under 35 U.S.C. 154(b) by 738 days.

(21) Appl. No.: 10/199,565

(22) Filed: Jul. 19, 2002

(65) Prior Publication Data

US 2004/0010990 A1 Jan. 22, 2004

(51) Int. Cl.
*H02G 3/08* (2006.01)
*H02G 3/30* (2006.01)

(52) U.S. Cl.
USPC ................. 174/50; 174/58; 174/66; 220/242; 220/241; 52/1

(58) Field of Classification Search
USPC ........... 362/148, 150; 52/1, 219, 232, 783.13, 52/784.11; 174/57, 66, 67, 50, 58; 220/242, 241
See application file for complete search history.

(56) References Cited

U.S. PATENT DOCUMENTS

| | | | | | |
|---|---|---|---|---|---|
| 2,545,145 | A | * | 3/1951 | Hoyle | 242/118.4 |
| 2,717,955 | A | * | 9/1955 | McGinty et al. | 362/311 |
| 3,281,522 | A | * | 10/1966 | Anisfield | 174/50 |
| 3,622,029 | A | * | 11/1971 | Ware | 220/3.7 |
| 3,690,501 | A | * | 9/1972 | Ware | 220/3.94 |
| 3,803,341 | A | * | 4/1974 | Klinkman et al. | 174/48 |
| 3,883,732 | A | * | 5/1975 | Peterson et al. | 362/294 |
| 3,917,101 | A | * | 11/1975 | Ware | 220/3.2 |
| 3,980,197 | A | * | 9/1976 | Ware | 220/3.6 |
| 4,087,624 | A | * | 5/1978 | Hitchcock | 174/57 |
| 4,345,693 | A | * | 8/1982 | Balkwill et al. | 220/3.3 |
| 4,375,142 | A | * | 3/1983 | McDonald | 52/28 |
| 4,400,766 | A | * | 8/1983 | Munson | 362/376 |
| 4,605,139 | A | * | 8/1986 | Dacar | 220/3.4 |
| 4,613,728 | A | * | 9/1986 | Lathrop | 174/53 |
| 4,616,104 | A | * | 10/1986 | Lindsey | 174/48 |
| 4,850,173 | A | | 7/1989 | Beyer et al. | |
| 5,005,792 | A | * | 4/1991 | Rinderer | 248/205.1 |
| 5,012,043 | A | * | 4/1991 | Seymour | 174/57 |

(Continued)

FOREIGN PATENT DOCUMENTS

| | | |
|---|---|---|
| JP | 6 78434 | 3/1994 |
| JP | 6 86424 | 3/1994 |

(Continued)

OTHER PUBLICATIONS

*Fire Resistance Ratings—ANSI/UL 263, Guide Information for Fire Resistance Rating*, Online Certifications Directory, http://database.ul.com/cgi-bin/XYV/emplate/LISEXT/1FRAME/showpage.html?&name=BXUV.GuideInfo&ccnshorttitle=Fire&Resis Jul. 2, 2002, pp. 1-41.

(Continued)

*Primary Examiner* — Phi A
(74) *Attorney, Agent, or Firm* — Seager, Tufte & Wickheim LLC

(57) ABSTRACT

A fire resistant assembly which may be used to ensure the fire resistance of a fire barrier such as a wall, comprising a first layer having a lumen therein, a second layer adjacent the first layer, and a box having a cavity defined by a wall, an opening in the wall, and a flange proximate the opening, wherein the box is disposed between the first layer and the second layer and wherein the opening is disposed on the lumen of the first layer.

9 Claims, 2 Drawing Sheets

(56) References Cited

U.S. PATENT DOCUMENTS

| | | | | | |
|---|---|---|---|---|---|
| 5,117,996 | A | * | 6/1992 | McShane | 220/3.7 |
| 5,222,800 | A | * | 6/1993 | Chan et al. | 362/147 |
| 5,456,050 | A | | 10/1995 | Ward | |
| 5,461,838 | A | | 10/1995 | Heller | |
| 5,595,362 | A | * | 1/1997 | Rinderer et al. | 248/27.1 |
| 5,609,006 | A | * | 3/1997 | Boyer | 52/731.9 |
| 5,659,151 | A | * | 8/1997 | Dale | 174/48 |
| 5,750,927 | A | | 5/1998 | Baltazar | |
| 5,823,664 | A | * | 10/1998 | Demshki et al. | 362/366 |
| 5,887,396 | A | | 3/1999 | Thoreson | |
| 6,105,334 | A | | 8/2000 | Monson et al. | |
| 6,119,411 | A | | 9/2000 | Mateu Gil et al. | |
| 6,174,076 | B1 | * | 1/2001 | Petrakis et al. | 362/365 |
| 6,252,167 | B1 | * | 6/2001 | Rose | 174/66 |
| 6,357,891 | B1 | | 3/2002 | Newbold et al. | |
| 6,360,502 | B1 | | 3/2002 | Stahl, Jr. | |
| 6,412,249 | B1 | * | 7/2002 | Boyer et al. | 52/731.9 |
| 6,521,834 | B1 | * | 2/2003 | Dykhoff et al. | 174/66 |
| 6,554,458 | B1 | * | 4/2003 | Benghozi | 362/365 |
| 6,632,006 | B1 | * | 10/2003 | Rippel et al. | 362/366 |
| 6,655,813 | B1 | * | 12/2003 | Ng | 362/148 |
| 6,698,146 | B2 | | 3/2004 | Morgan et al. | |
| 6,752,513 | B2 | * | 6/2004 | Plunk | 362/150 |
| 6,838,618 | B2 | | 1/2005 | Newbold et al. | |
| 2003/0019523 | A1 | * | 1/2003 | Dicosola | 137/360 |

FOREIGN PATENT DOCUMENTS

| | | | | |
|---|---|---|---|---|
| JP | 78434 | * | 3/1994 | 174/66 |
| JP | 86424 | * | 3/1994 | 174/57 |
| JP | 6 98441 | | 4/1994 | |
| JP | 98441 | * | 4/1994 | 174/57 |

OTHER PUBLICATIONS

Fire Resistance, Design Solutions-Fire Construction-Fire Tests-Fire Resistance, http://www.usg.com/Design_Solutions/2_2_10_fire_endure.asp Jul. 2, 2002, pp. 1-5.

*Fire Resistance Ratings-ANSI/UL 263, Guide Information*, Online Certifications Directory, http://database.ul.com/cgi-bin/XYV/template/LISEXT/1FRAME/showpage.html?name=BXUV.L528&ccnshorttitle=Fire+Resistances+ Jul. 2, 2002, pp. 1-12.

* cited by examiner

FIRE RESISTANT BARRIER

FIELD OF THE INVENTION

The invention relates to a fire barrier having a recess for a device. More particularly, the invention relates to a recessed box installed in a building for use with maintaining a minimum fire endurance of a building surface.

BACKGROUND OF THE INVENTION

Typically, a surface of a building such as a floor or a ceiling provides a fire barrier. A fire barrier resists the spread of a fire through it by providing a resistance to flammability, a resistance to heat transmission, and sufficient structural integrity to resist decomposing when exposed to heat or flames. The effectiveness of a fire barrier is often rated by exposure to a fire of specified and increasing intensity and a rating is a period of time, typically in hours during which the fire barrier is effective. When an aperture is made in one of these fire barriers, the effectiveness of the fire barrier is decreased dramatically. Often it is nonetheless desirable to create an aperture in a fire barrier, for example, to install recessed lighting or a floor drain. To restore the fire barrier and maintain an effective minimum resistance to fire, a construction worker will typically build a box of gypsum board and install it around the recessed fixture proximate the aperture created in the fire barrier. The construction of this box is a time consuming task and provides no mechanism to ascertain to what degree the effectiveness of the fire barrier is restored.

SUMMARY OF THE INVENTION

The present invention pertains to a prefabricated box suitable for use with a wide variety of recessed devices. The prefabricated box may be easily installed and may provide a known degree of fire endurance.

An embodiment of the invention pertains to a fire barrier. A box, comprising a cavity defining a wall, a opening in the wall, and a flange proximate the opening, may be disposed between a first and a second layer, the opening of the box covering a lumen of the first layer. The box may be attached to a first and a second structural member. A device may be disposed in the lumen of the first layer and extend into the cavity of the box. There may be a gap between the device and the wall of the box and between the wall of the box and the second layer. The box may comprise steel or other suitable material and the wall of the box may be impervious to the passage of air. The fire barrier may be rated for 1 hour or greater fire endurance rating under ASTM E-119 or other comparable test and certification of the rating may be found with or on the box.

DETAILED DESCRIPTION OF ILLUSTRATIVE EMBODIMENTS

Figure 1:
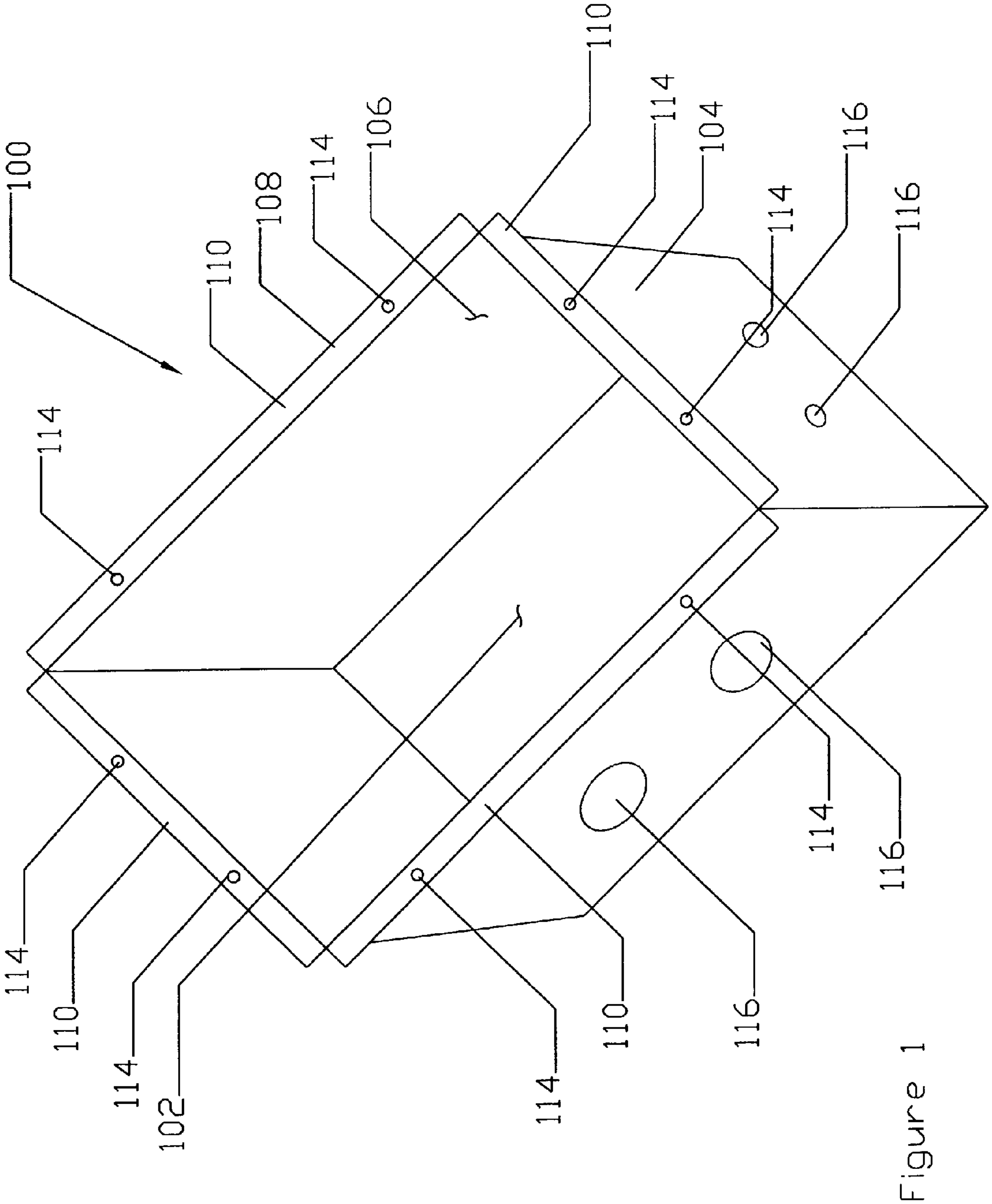
FIG. 1 is a perspective view of box 100 for providing fire resistance according to the invention.

Reference is now made to the figures, in which like element numbers refer to like elements throughout. FIG. 1 is a perspective view of box 100, which includes cavity 102 defining a wall 104. Opening 106 provides access to cavity 102 and flange 108 is disposed proximate opening 106. It is to be understood that, while wall 104 is shown in FIG. 1 to be comprised of five flat surfaces and the opening, any shape defined by a cavity and having an opening may be suitable. For example, a cylinder open at one end may be suitable.

Flange 108 may be comprised of one or more individual pieces 110 and generally defines a flat surface 112 facing away from cavity 102. Flange 108 is shown as comprising a lip extending a uniform distance away from the edge of the opening. It is to be understood however, that many more configurations that may be suitable are; contemplated. For example, flange 108 may have struts which extend over the opening to provide means for attaching a device such as a light fixture. In addition, flange 108 may have wings that extend from the opening to provide additional means for attaching the box in the fire barrier. Flange 108 may include means for attaching box 100 to a structural member such as lumens 114 for receiving nails or screws.

Wall 104 may include punch-outs 116 that permit ready removal with a hammer or screwdriver for created additional openings to the cavity. Punch-outs 116 generally comprises one or more grooves of reduced wall thickness formed in a closed pattern. Punch-outs 116 may be of several shapes and sizes to allow for the creation of additional openings adapted to specific tasks.

Figure 2:
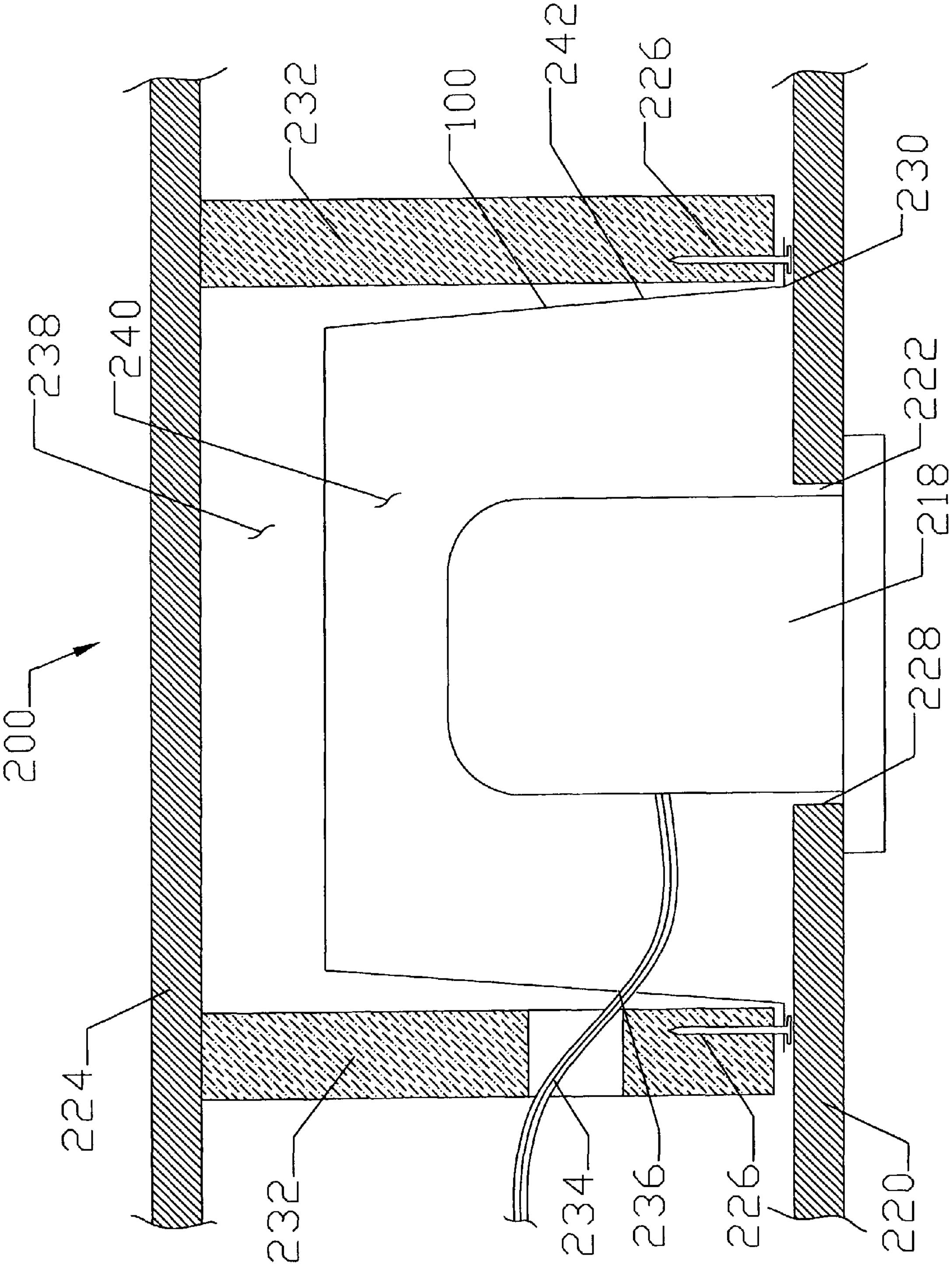
FIG. 2 is a cross sectional view of box 100 positioned inside a fire barrier.

FIG. 2 is a cross sectional view of box 100 disposed in a fire barrier 200, which is fire resistant, and having a device 218 disposed therein.

The term “fire resistant” is herein defined to refer to the ability of a structure to serve as a barrier to the spread of fire. To serve as an effective barrier to the spread of fire, a structure must exhibit the following characteristics. First, it must not pass flame or hot gas from one side to the other. Second, the structure must support the imposed design loads without structural failure or collapse. Third, the structure must resist the transmission of heat so that the surface not exposed to the fire does not exceed the temperature of 250° F. Fourth, the structure must withstand lateral impacts from falling debris. This is definition of the term “fire resistant” as understood by those of skill in the art.

Fire barrier 200 is disposed in a building; suitable fire barriers may comprise a floor and a ceiling, a ceiling and a roof, or a wall and a wall. The fire barrier depicted in FIG. 2 comprises a ceiling and the floor above. Fire barrier 200 may be comprised of a first layer 220 having a lumen 222 therein, a second layer 224, and box 100 disposed therebetween. Fire barrier 200 may also comprise structural members 232, such as joists, to which box 100 may be fastened using fasteners 226. Box 100 may also be fastened using other suitable means such as a high temperature epoxy or spot welding.

Lumen 222 generally has a perimeter 228 which may be smaller than the perimeter 230 of opening 106. Layer 220, therefore, may extend over flange 108 and perimeter 230. A device 232 may be disposed in lumen 222 and extend into cavity 102. This device may be any device installed in a fire barrier. The device may be, for instance, an electrical device such as a light fixture or a fan, or it may be a different device, such as a floor drain. If device 218 is an electrical device, it may have wires 234 extending therefrom. A punch-out of the appropriate size may be removed, providing an opening 236 though which wires 234 may extend. It may be desirable to provide an opening 236 that is not substantially larger than the cross section of the objects extending therethrough in order to maintain the integrity of the fire barrier. There may be a gap 238 between wall 104 and layer 222 and there may also be a gap 240 between device 218 and wall 104. These gaps may enhance the fire resistance of fire barrier 200.

Layers 220 and 222 may comprise materials well known by those of skill in the art such as gypsum board, plywood, plaster, or tile. Box 100 may be comprised of steel or other material having a melting temperature, for example, above 1700° Fahrenheit such as ceramic. For example, box 100 may be comprised of 24-gauge stainless steel. This material may be galvanized to resist corrosion. Wall 100 may have a perimeter wall 242 that has an angle with the flange of greater than 90 degrees. This may facilitate stacking of boxes 100. If box 100 comprises joints, these joints should be sealed by welding or another suitable process to make wall 104 substantially impermeable to air flow.

Fire barrier 200 should be capable of an ASTM E-119 fire resistance rating of at least 1 hour. A fire resistance rating of 1 hour exposes one side of the fire barrier to the following sequence of temperatures: 1000° F. for 5 minutes, 1400° F. for 15 minutes, 1550° F. for 30 minutes, and 1700° F. for 10 minutes. At no time during this test should the fire barrier permit flames or hot gases through to the unexposed surface or allow the unexposed surface to exceed 250° F. This test was designed to simulate the conditions a real fire might expose a fire barrier to. Of course, if this test is updated to reflect new understandings of the conditions of a fire, the fire barrier should be capable of a comparable rating under the new test.

Fire barrier 200 may be rated under ASTM E-119 or a comparable test. The process of rating includes creating a fire barrier 200 and subjecting it to the test. A rated fire barrier 200 may permit installation of box 100 in fire barriers governed by regulations. Certification of the rating may be included with box 100. Certification may also be affixed on box 100, either on a label or permanently impressed into box 100 by stamping, etching or some similar process.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method of providing a fire barrier in a building, the steps comprising:

providing a first layer having a first surface, a second surface, and a first lumen therebetween;

providing a second layer spaced apart from the first layer having a first surface and a second surface;

providing a first structural member disposed between the first layer and the second layer, said first structural layer positioned generally adjacent the first lumen of the first layer and joined to the second surface of the first layer;

providing a second structural member disposed between the first layer and the second layer, said first structural layer positioned generally adjacent the first lumen of the first layer and joined to second surface of the first layer;

providing a metal wall member being continuously fire resistant, the wall member defining a cavity and an opening thereto, wherein the fire resistant metal wall is adapted to substantially seal the lumen of the first layer against the passage of heated gas the fire resistant metal wall not comprising a layer proximate the wall made from a material selected from the group consisting of intumescent materials and cementitious material;

providing a flange at least partially surrounding the opening defined by the wall member and attached proximate the join between the first layer and the first structural member and proximate the join between the first layer and the second structural member;

attaching the flange proximate the join between the first layer and the first structural member and proximate the join between the first layer and the second structural member, wherein the first lumen of the first layer lies everywhere within the opening defined by the continuous metal wall member; and disposing a light fixture in the lumen of the first layer and extending into the cavity defined by the continuous fire resistant metal wall member.

2. The method of claim 1, wherein the step of disposing the light fixture further comprises the step of providing a gap between the light fixture and the fire resistant wall.

3. The method of claim 1, wherein the step of providing a continuous fire resistant metal wall member further comprises the step of providing a metal wall member having a punch-out, and further comprising the step of removing the punch-out to create an aperture in the a continuous fire resistant metal wall member.

4. The method of claim 1, wherein the step of providing a continuous fire resistant metal wall member further comprises the step of providing a metal wall member wherein an angle between the flange and the fire resistant wall is greater than 90 degrees.

5. The method of claim 4, wherein the flange is planar.

6. The method of claim 1, further comprising the step of providing a gap between the continuous fire resistant metal wall member and the second layer.

7. The method of claim 1, wherein the first layer is a ceiling.

8. The method of claim 1, wherein the second layer is a floor.

9. The method of claim 1, wherein each of the first and second structural members is an elongate structural member of the building.

* * * * *